United States Patent
Shirahatti et al.

(10) Patent No.: US 12,426,089 B2
(45) Date of Patent: Sep. 23, 2025

(54) SELECTIVE CELLULAR INTERFERENCE MITIGATION FOR GNSS

(71) Applicant: Apple Inc., Cupertino, CA (US)

(72) Inventors: Harsha Shirahatti, Santa Clara, CA (US); Helena D O'Shea, San Diego, CA (US); Mohamed Youssef, San Jose, CA (US); Aditya N Srivastava, Fremont, CA (US); Glenn D MacGougan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 761 days.

(21) Appl. No.: 17/700,115

(22) Filed: Mar. 21, 2022

(65) Prior Publication Data

US 2023/0091349 A1 Mar. 23, 2023

Related U.S. Application Data (60) Provisional application No. 63/247,202, filed on Sep. 22, 2021.

(51) Int. Cl.
*H04W 74/0816* (2024.01)
*H04L 5/00* (2006.01)
*H04W 72/0453* (2023.01)

(52) U.S. Cl.
CPC ....... *H04W 74/0816* (2013.01); *H04L 5/0046* (2013.01); *H04L 5/0073* (2013.01); *H04W 72/0453* (2013.01)

(58) Field of Classification Search
CPC .............. H04L 5/0046; H04L 5/0073; H04W 72/0453; H04W 74/0816
See application file for complete search history.

(56) References Cited

U.S. PATENT DOCUMENTS

| 7,103,316 B1* | 9/2006 | Hall ................. H04B 17/318 455/226.2 |
| 8,526,388 B1* | 9/2013 | Kaukovuori ........ H04W 72/541 455/450 |

(Continued)

FOREIGN PATENT DOCUMENTS

| WO | 2010030938 A1 | 3/2010 |
| WO | 2012041255 A1 | 4/2012 |

OTHER PUBLICATIONS

Extended European Search Report for EP Patent Application No. 22190774.4 dated Jun. 6, 2023; 20 pgs.

*Primary Examiner* — Brian P Cox
(74) *Attorney, Agent, or Firm* — FLETCHER YODER PC (57) ABSTRACT

User equipment (UE) may determine a probability that a cellular network may allocate a resource block to the UE having a frequency that, when a cellular transmitter of the UE transmits a radio frequency (RF) signal using the resource block, a harmonic signal may be generated that interferes with a global navigation satellite systems (GNSS) signal received by a GNSS receiver of the UE. The probability may be determined based on a number of factors that may impact resource block allocation, including a location of the UE, a current date and/or time, a historical allocation of resource blocks (which may be crowdsourced), a client type associated with a signal to be transmitted, a signal environment at the UE, real world conditions, and so on. Based on the probability, the UE may selectively perform a mitigation procedure or transmit an RF signal without performing the mitigation procedure.

20 Claims, 4 Drawing Sheets

(56) References Cited

U.S. PATENT DOCUMENTS

| | | |
|---|---|---|
| 10,236,998 B1* | 3/2019 | Monajemi .............. H04B 15/00 |
| 10,834,678 B1* | 11/2020 | Marupaduga ....... H04W 52/367 |
| 2011/0201372 A1 | 8/2011 | Luo et al. |
| 2015/0035701 A1 | 2/2015 | Zhang et al. |
| 2015/0215947 A1 | 7/2015 | Kaukovuori |
| 2016/0234748 A1* | 8/2016 | Chrisikos .............. H04L 43/065 |
| 2017/0317232 A1 | 11/2017 | Togawa et al. |
| 2018/0317232 A1 | 11/2018 | Kumar et al. |
| 2019/0316886 A1 | 10/2019 | Lennen |
| 2019/0326886 A1 | 10/2019 | Lennen |
| 2020/0154440 A1* | 5/2020 | Gholmieh ............... H04W 4/40 |
| 2021/0227365 A1* | 7/2021 | Vassilovski ............ H04W 4/46 |
| 2022/0029643 A1* | 1/2022 | Oh .......................... H04B 1/04 |

* cited by examiner

SELECTIVE CELLULAR INTERFERENCE MITIGATION FOR GNSS

CROSS-REFERENCE TO RELATED APPLICATIONS

This application claims priority to U.S. Provisional Application No. 63/247,202, filed Sep. 22, 2021, entitled "SELECTIVE CELLULAR INTERFERENCE MITIGATION FOR GNSS," the disclosure of which is incorporated by reference in its entirety for all purposes.

BACKGROUND

The present disclosure relates generally to wireless communication, and more specifically to radio frequency interference in wireless communication devices.

A wireless communication device may include a transmitter and a receiver. The transmitter may send a transmission signal having a transmission frequency, and the receiver may receive a receive signal having a receive frequency. However, the transmission signal may generate a harmonic signal having a harmonic frequency that is close to or overlaps with the receive frequency. As such, the harmonic signal may interfere with the receive signal, degrading the receive signal.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a transceiver, a global navigation satellite systems (GNSS) receiver, and processing circuitry. The processing circuitry receives an indication to transmit a signal using the transceiver, receives a location via the GNSS receiver, and receives a time of day. The processing circuitry also selectively mitigates interference resulting from transmitting the signal using the transceiver based on the location and the time of day, and causes the transceiver to transmit the signal based on selectively mitigating the interference.

In another embodiment, a method includes receiving, at processing circuitry of a wireless communication device, an indication to transmit a signal using a transmitter of the wireless communication device to execute a client process. The method also includes receiving, at the processing circuitry, a signal characteristic for transmitting the signal. The method further includes selectively mitigating, by the processing circuitry, interference resulting from transmitting the signal using the transmitter to execute the client process based on the client process and the signal characteristic. The method also includes causing, by the processing circuitry, the transmitter to transmit the signal based on selectively mitigating the interference.

In yet another embodiment, one or more tangible, non-transitory, computer-readable media stores computer-readable instructions that cause one or more processors of a wireless communication device to receive an indication to transmit a signal using a transmitter of the wireless communication device and receive a location of the wireless communication device and a time of day. The computer-readable instructions also cause the one or more processors to receive crowdsourced resource block allocation data corresponding to the location of the wireless communication device and the time of day. The computer-readable instructions further cause the one or more processors to receive resource block use probability for transmitting the signal using the transmitter based on the crowdsourced resource block allocation data. The computer-readable instructions also cause the one or more processors to selectively mitigate interference resulting from transmitting the signal using the transmitter based on the resource block use probability, and cause the transmitter to transmit the signal based on selectively mitigating the interference.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to selectively mitigating cellular interference on global navigation satellite systems (GNSS) signals. A transmitter of a wireless communication device may send a transmission signal having a transmission frequency, and a receiver of the wireless communication device may receive a receive signal having a receive frequency. However, the transmission signal may generate a harmonic signal having a harmonic frequency that is close to or overlaps with the receive frequency. That is, transmitting the transmission signal may result in generation of one or more harmonic signals having harmonic frequencies that are multiples of the transmission frequency. As such, the harmonic signal may interfere with the receive signal, thus degrading the receive signal, which may result in data loss at the receiver. For example, the transmitter may include a cellular transmitter transmitting a transmission signal within the Long Term Evolution (LTE) frequency band 13 (e.g., a 700 megahertz (MHz) frequency band, having an uplink frequency range of 777 to 787 MHz) or the LTE frequency band 14 (e.g., a 700 MHz frequency band, having an uplink frequency range of 788 to 798 MHz). This transmission signal may generate a harmonic signal at twice the frequency of an LTE frequency band 13 or 14 frequency (e.g., 1554 to 1596 MHz), which may be close to or overlap with a GNSS signal in the GNSS frequency band L1 (e.g., centered at 1575.42 MHz). Accordingly, the transmission signal may interfere with the GNSS signal. It should be understood that references to LTE frequency bands 13 and 14 and GNSS frequency band L1 are exemplary, and the embodiments disclosed herein may apply to any suitable bands that interfere with other bands, or any suitable bands for which transmission in those bands result in harmonic signals that interfere with other bands.

In some cases, this interference by the cellular transmission on the GNSS reception may be mitigated by decreasing power of or ceasing the cellular transmission (e.g., on the LTE frequency band 13 and/or 14) and/or decreasing power to or deactivating the GNSS receiver (e.g., by decreasing an automatic gain control) in anticipation of the cellular transmission. In additional or alternative cases, resource block combination-based machine-learning filters may be used to filter the transmission signals from the GNSS receive signal.

However, such filters may consume excessive power (e.g., the filters may be activated for length periods of time or always be active). Moreover, these mitigation procedures may be implemented when it is unnecessary. In particular, at a given time (e.g., every 1 millisecond (ms)), a network (e.g., a cellular network) may allocate a number of resource blocks (e.g., 50). Each resource block may include a different frequency range. In some cases, the number of allocable resource blocks may change (e.g., decrease) as time progresses. For example, at 0 ms, the number of allocable resource blocks may be 50, and the network may allocate any number of the 50 allocable resource blocks to a wireless communication device (e.g., user equipment). At 1 ms, the number of allocable resource blocks may be reduced by 1 (e.g., totaling 49), and the network may allocate any number of the 49 allocable resource blocks to the user equipment. However, at the end of such a cycle, such as at 49 ms, there may be only one allocable resource block to allocate to the user equipment. This allocation may be referred to as "1 RB 49," as it is 1 resource block in length and begins at the resource block indexed at 49. (Resource blocks may generally begin at a resource block indexed at 0.) For LTE bands 13 and/or 14, this single resource block may include a frequency range that, if a harmonic is generated, may interfere with the GNSS L1 band. The other 49 resource blocks may not interfere with the GNSS L1 band, as they include frequency ranges that, if a harmonic is generated, may not interfere with the GNSS L1 band. Thus, in such a case, it is only when there is one allocable resource block that mitigation procedures need be performed.

Figure 1:
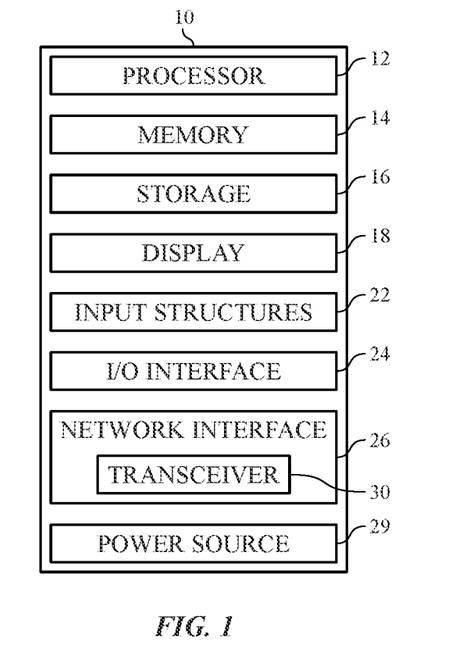
FIG. 1 is a block diagram of user equipment, according to embodiments of the present disclosure.

FIG. 1 is a block diagram of user equipment 10 (e.g., an electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
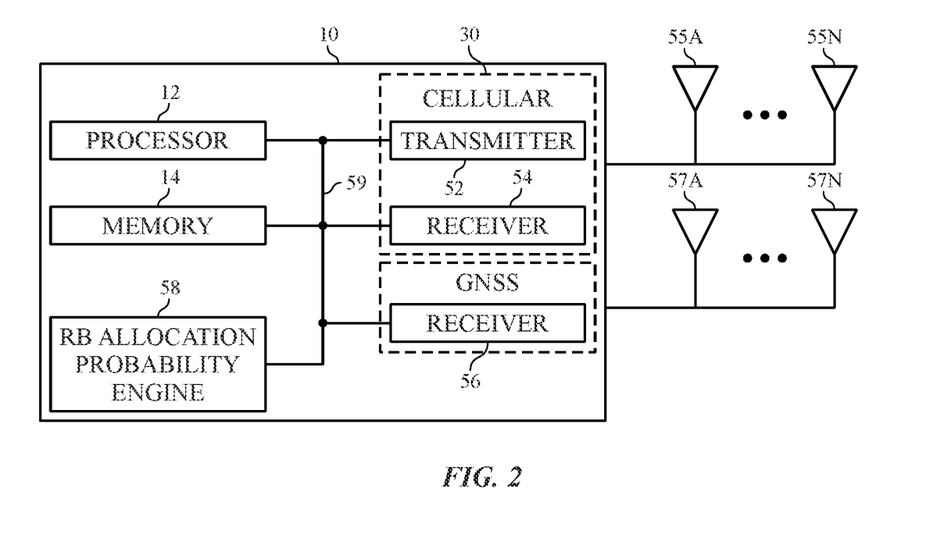
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

In particular, the transceiver 30 may be in the form of a cellular transceiver 30 having a cellular transmitter 52 and/or a cellular receiver 54 that respectively enable transmission and reception of cellular signals between the user equipment 10 and an external device via, for example, a cellular network (e.g., including base stations, such as NodeBs, eNBs or eNodeBs (Evolved NodeBs or E-UTRAN (Evolved Universal Mobile Telecommunications System (UMTS) Terrestrial Radio Access Network) NodeBs, or gNodeBs (e.g., Next Generation NodeB)). As illustrated, the cellular transmitter 52 and the cellular receiver 54 may be combined into the cellular transceiver 30.

Additionally, the user equipment 10 may also include a GNSS receiver 56 that may enable the user equipment 10 to receive GNSS signals from a GNSS network, including one or more GNSS satellites or GNSS ground stations. The GNSS signals may include a GNSS satellite's observation data, broadcast orbit information of tracked GNSS satellites, and supporting data, such as meteorological parameters, collected from co-located instruments of a GNSS satellite. For example, the GNSS signals may be received from a Global Position System (GPS) network, a Global Navigation Satellite System (GLONASS) network, a BeiDou Navigation Satellite System (BDS), a Galileo navigation satellite network, a Quasi-Zenith Satellite System (QZSS or Michibiki) and so on.

The user equipment 10 may also have one or more antennas 55A-55N (collectively 55) electrically coupled to the cellular transceiver 30, and one or more antennas 57A-57N (collectively 57) electrically coupled to the GNSS receiver 56. The antennas 55, 57 may be configured in an omnidirectional or directional configuration, in a single-beam, dual-beam, or multi-beam arrangement, and so on. Each antenna 55, 57 may be associated with one or more beams and various configurations. In some embodiments, multiple antennas of the antennas 55, 57 of an antenna group or module may be communicatively coupled a respective transceiver 30 or GNSS receiver 56 and each emit radio frequency signals that may constructively and/or destructively combine to form a beam. The user equipment 10 may include multiple transmitters, multiple receivers, multiple transceivers, and/or multiple antennas as suitable for various communication standards.

The user equipment 10 may include a resource block (RB) allocation probability engine 58, which may be implemented as hardware (e.g., circuitry), software (e.g., instructions stored in the memory 14 and/or the storage 16), or both (e.g., as logic). The resource block allocation probability engine 58 may determine a probability that a cellular network (e.g., a 3G cellular network, a 4G/LTE cellular network, a 5G/NR cellular network, or the like) may allocate a resource block to the user equipment 10 having a frequency that, when the cellular transmitter 52 transmits a signal using the resource block, a harmonic signal may be generated that interferes with a GNSS signal received by the GNSS receiver 56. For example, the resource block may be within the LTE frequency band 13 or 14, and the GNSS signal may be within the GNSS L1 frequency band. The resource block allocation probability engine 58 may receive a number of inputs and determine the probability based on the inputs. In some embodiments, the inputs may include a location of the user equipment 10, a current date and/or time, a historical allocation of resource blocks (which may be crowdsourced), a client type associated with a signal to be transmitted, a signal environment at the user equipment 10, real world conditions, and so on. Thus, ultimately, the resource block allocation probability engine 58 may determine a probability that cellular transmission by the cellular transmitter 52 may interfere with the GNSS signal, and determine whether to perform a mitigation procedure based on the probability.

As illustrated, the various components of the user equipment 10 may be coupled together by a bus system 59. The bus system 59 may include a data bus, for example, as well as a power bus, a control signal bus, and a status signal bus, in addition to the data bus. The components of the user equipment 10 may be coupled together or accept or provide inputs to each other using some other mechanism.

Figure 3:
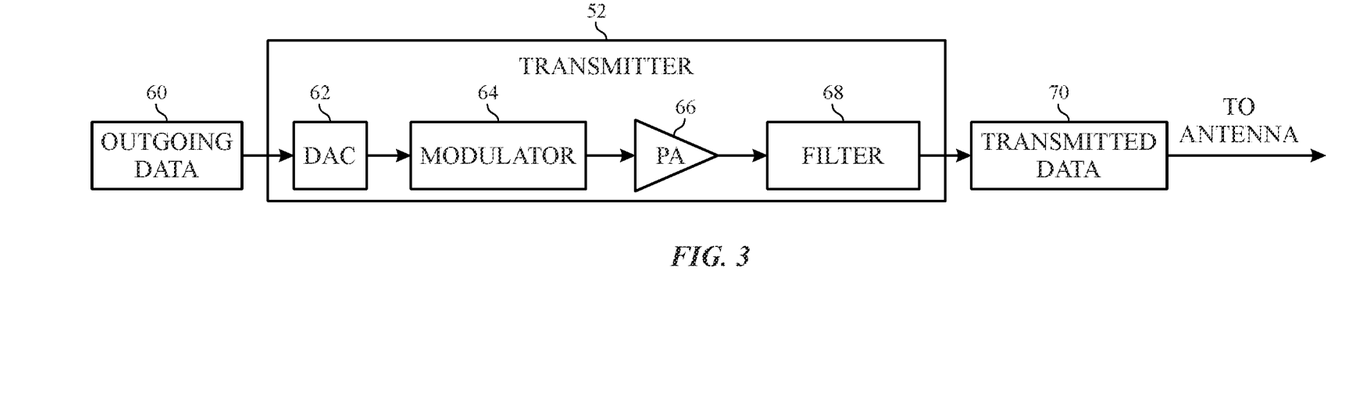
FIG. 3 is a schematic diagram of a transmitter of the user equipment of FIG. 1, according to embodiments of the present disclosure.

FIG. 3 is a schematic diagram of the cellular transmitter 52 (e.g., transmit circuitry), according to embodiments of the present disclosure. As illustrated, the cellular transmitter 52 may receive outgoing data 60 in the form of a digital signal to be transmitted via the one or more antennas 55. A digital-to-analog converter (DAC) 62 of the cellular transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the cellular transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the cellular transmitter 52 may include any suitable additional components not shown, or may not include certain of the illustrated components, such that the cellular transmitter 52 may transmit the outgoing data 60 via the one or more antennas 55. For example, the cellular transmitter 52 may include a mixer and/or a digital up converter. As another example, the cellular transmitter 52 may not include the filter 68 if the power amplifier 66 outputs the amplified signal in or approximately in a desired frequency range (such that filtering of the amplified signal may be unnecessary).

Figure 4:
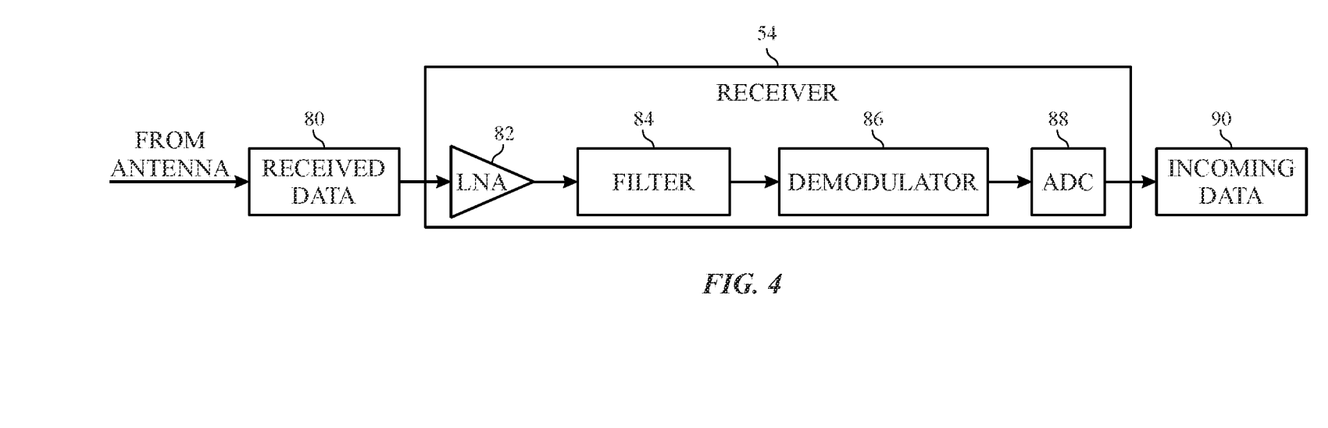
FIG. 4 is a schematic diagram of a receiver of the user equipment of FIG. 1, according to embodiments of the present disclosure.

FIG. 4 is a schematic diagram of a receiver 54, 56 (e.g., receive circuitry) of the user equipment 10, according to embodiments of the present disclosure. In particular, the receiver 54, 56 may include the cellular receiver 54 and/or the GNSS receiver 56 shown in FIG. 2. As illustrated, the receiver 54, 56 may receive received data 80 (e.g., cellular data or GNSS data) from the one or more antennas 55, 57 in the form of an analog signal. A low noise amplifier (LNA) 82 may amplify the received analog signal to a suitable level for the receiver 54, 56 to process. A filter 84 (e.g., filter circuitry and/or software) may remove undesired noise from the received signal, such as cross-channel interference. The filter 84 may also remove additional signals received by the one or more antennas 55, 57 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. For example, the filter 84 may include one or more resource block combination-based machine-learning filters that filter transmission signals of a certain frequency (e.g., 1554 to 1596 MHz of a harmonic signal caused by transmission of a cellular signal in the LTE frequency band 13 or 14) from the GNSS receive signal (e.g., which may be in the GNSS frequency band L1, centered at 1575.42 MHz).

The receiver 54, 56 may also include a demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the user equipment 10. Additionally, the receiver 54, 56 may include any suitable additional components not shown, or may not include certain of the illustrated components, such that the receiver 54, 56 may receive the received data 80 via the one or more antennas 55, 57. For example, the receiver 54, 56 may include a mixer and/or a digital down converter.

Figure 5:
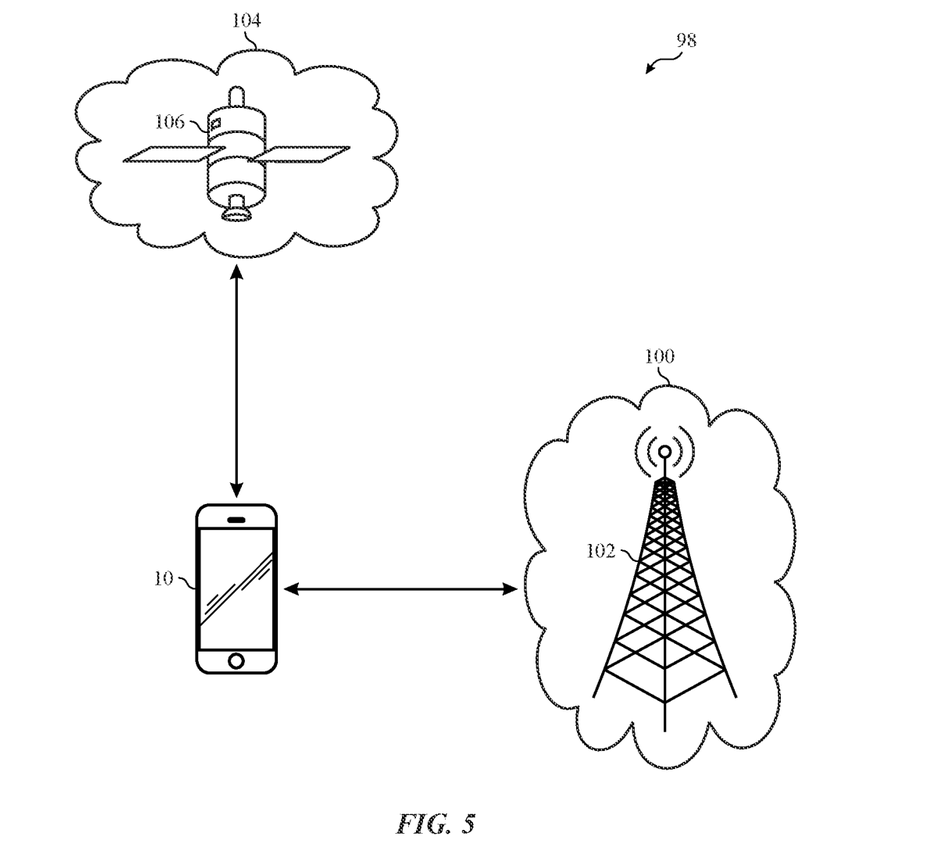
FIG. 5 is a schematic diagram of a communication system having the user equipment of FIG. 1 communicatively coupled to a cellular network via a cellular base station, and communicatively coupled to a global navigation satellite systems (GNSS) network via a GNSS satellite, according to embodiments of the present disclosure.

FIG. 5 is a schematic diagram of a communication system 98 having the user equipment 10 communicatively coupled to a cellular network 100 (e.g., a 3G cellular network, a 4G/LTE cellular network, a 5G/NR cellular network, or the like) via a cellular base station 102 (e.g., a NodeB, an eNodeB, gNodeB, or the like), and communicatively coupled to a GNSS network 104 via a GNSS satellite 106, according to embodiments of the present disclosure. The cellular network 100 may be implemented and/or supported by multiple such base stations 102, radio access networks, core networks, and so on. Similarly, the GNSS network 104 may be implemented and/or supported by multiple such GNSS satellites 106, ground stations, and so on. However, in some cases, the user equipment 10 may send a transmission signal using the cellular transmitter 52 that may generate a harmonic signal having a harmonic frequency that is close to or overlaps with a receive frequency of the GNSS signal sent by the GNSS satellite 106 and received by the GNSS receiver 56 of the user equipment 10, which may interfere with the GNSS signal, as discussed above.

The cellular transmitter 52 may transmit a cellular signal within the LTE frequency band 13 (e.g., a 700 megahertz (MHz) frequency band, having an uplink frequency range of 777 to 787 MHz) or the LTE frequency band 14 (e.g., a 700 MHz frequency band, having an uplink frequency range of 788 to 798 MHz). This cellular signal may generate a harmonic signal at twice the frequency of an LTE frequency band 13 or 14 frequency (e.g., 1554 to 1596 MHz), which may be close to or overlap with a GNSS signal received by the GNSS receiver 56 in the GNSS frequency band L1 (e.g., centered at 1575.42 MHz). Accordingly, the cellular signal may interfere with the GNSS signal.

In some cases, this interference by the cellular transmission on the GNSS reception may be mitigated by decreasing power of or ceasing the cellular transmitter 52 (e.g., at least on the LTE frequency band 13 and/or 14) and/or decreasing power to or deactivating the GNSS receiver 56 (e.g., by decreasing an automatic gain control) in anticipation of the cellular transmission. In additional or alternative cases, a filter (e.g., 84) of the GNSS receiver 56 may include a resource block combination-based machine-learning filter that filters the transmission signals of a certain frequency (e.g., 1554 to 1596 MHz of a harmonic signal caused by transmission of a cellular signal in the LTE frequency band 13 or 14) from the GNSS receive signal (e.g., which may be in the GNSS frequency band L1, centered at 1575.42 MHz), thus mitigating the interference.

However, such a filter may consume excessive power, since the filter may not be selectively applied and instead be activated for length periods of time or always be active. Moreover, these mitigation procedures may be implemented when it is unnecessary. In particular, at a given periodicity (e.g., every 1 millisecond (ms)), a network (e.g., the cellular network 100) may allocate time and frequency resources to the user equipment 10 to enable the user equipment 10 to send and/or receive radio frequency signals. The resources may be apportioned as resource blocks. However, the number of resource blocks that are allocable may be limited (e.g., up to 50 resource blocks may be allocable), and the number of allocable resource blocks may also change (e.g., decrease) with time. For example, at 0 ms, the number of allocable resource blocks may be at a maximum (e.g., 50), and the cellular network 100 may allocate any number of the 50 allocable resource blocks to the user equipment 10. At 1 ms, the number of allocable resource blocks may be reduced by 1 (e.g., totaling 49), and the cellular network 100 may allocate any number of the 49 allocable resource blocks to the user equipment 10. However, at the end of such a cycle, such as at 49 ms, there may be only one allocable resource block to allocate to the user equipment 10. For certain cellular frequency bands (e.g., LTE frequency bands 13 and/or 14), this single resource block may include a frequency range that, if a harmonic is generated when the user equipment 10 transmits a radio frequency signal using the single resource block, may interfere with a GNSS frequency band (e.g., the GNSS L1 band). The other 49 resource blocks may not interfere with the GNSS L1 band, as they may include frequency ranges that, if a harmonic is generated, may not interfere with the GNSS L1 band. Moreover, in the case where only a single resource block is allocable, there is an increased likelihood that interference will occur, as there is an increased likelihood (e.g., a 100% likelihood) that the single interfering resource block may be allocated, as there are no other resource blocks allocable. Compare this to when there are multiple (e.g., 2 or more, 4 or more, 50) resource blocks that are allocable, resulting in at least a 50% decrease in likelihood of the single interfering resource block being allocated. Thus, in such a case, it may be that only when there is one allocable resource block (e.g., at 49 ms in the resource block allocation cycle) that mitigation procedures may be performed.

Embodiments herein provide various apparatuses and techniques to selectively mitigate cellular interference (e.g., caused by transmission on the cellular transmitter 52) on GNSS signals (e.g., received by the GNSS receiver 56). In particular, the user equipment 10 may determine a probability that the cellular network 100 may allocate a resource block to the user equipment 10 having a frequency that, when the cellular transmitter 52 transmits a radio frequency signal using the resource block, a harmonic signal may be generated that interferes with a GNSS signal received by the GNSS receiver 56. Using the previous example, the resource block may be within the LTE frequency band 13 or 14, the GNSS signal may be within the GNSS L1 frequency band. The probability may be based on a number of factors that may impact resource block allocation, including a location of the user equipment 10, a current date and/or time, a historical allocation of resource blocks (which may be crowdsourced), a client type associated with a signal to be transmitted, a signal environment at the user equipment 10, real world conditions, and so on.

Based on the probability, the user equipment 10 may perform selectively perform a mitigation procedure or transmit a radio frequency signal without performing the mitigation procedure. For example, if the probability is greater than or equal to a threshold value, then the user equipment 10 may decrease power to the cellular transmitter 52 or prevent the cellular transmitter 52 from transmitting a signal, decrease a gain of or deactivate the GNSS receiver 56, activate one or more filters 84 to filter at least a portion of the cellular transmission signal from a GNSS signal received at the GNSS receiver 56, and so on. If the probability is less than the threshold value, the cellular transmitter 52 may transmit cellular signals to the base station 102 over the LTE frequency band 13 and/or 14, without performing a mitigation procedure.

Figure 6:
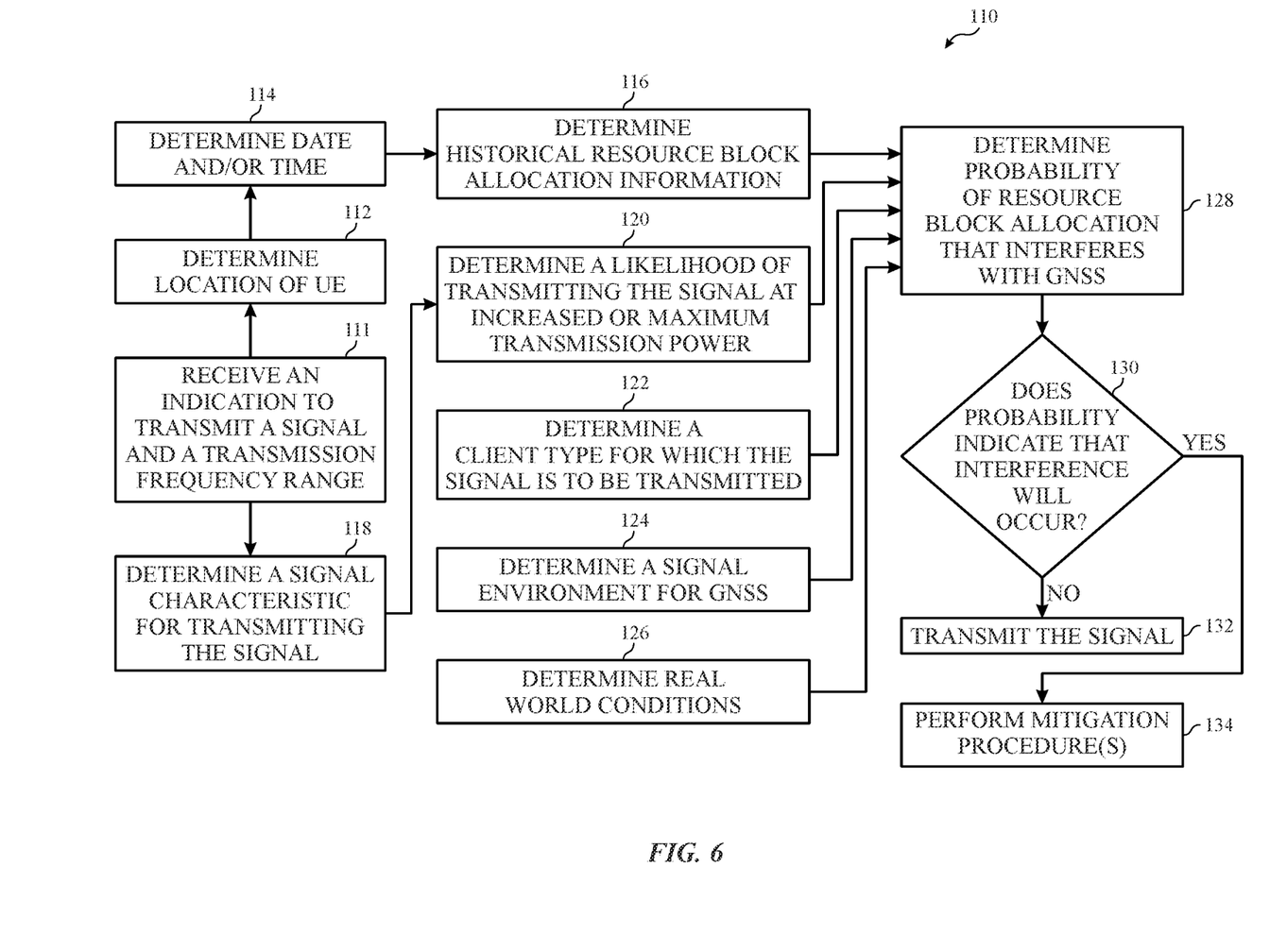
FIG. 6 is a flowchart of a method for selectively mitigating cellular interference, according to embodiments of the present disclosure.

FIG. 6 is a flowchart of a method 110 for selectively mitigating cellular interference, according to embodiments of the present disclosure. Any suitable device (e.g., a controller) that may control components of the user equipment 10, such as the processor 12 and/or the resource block allocation probability engine 58, may perform the method 110. In some embodiments, the method 110 may be implemented by executing instructions stored in a tangible, non-transitory, computer-readable medium, such as the memory 14 or storage 16, using the processor 12. For example, the method 110 may be performed at least in part by one or more software components, such as an operating system of the user equipment 10, one or more software applications of the user equipment 10, the resource block allocation probability engine 58, and the like. While the method 110 is described using steps in a specific sequence, it should be understood that the present disclosure contemplates that the described steps may be performed in different sequences than the sequence illustrated, and certain described steps may be skipped or not performed altogether.

In process block 111, the processor 12 receives an indication to transmit a signal and a transmission frequency range (e.g., from the cellular network 100 via the base station 102). In particular, the processor 12 may determine or receive an indication that a radio frequency signal is to be transmitted using the cellular transmitter 52 from a client of the user device 10. That is, a client (e.g., a software application, a first-party application, a third-party application, daemon, a thread, and so on) may execute a process on the user equipment 10 (e.g., via an operating system of the user equipment 10 and/or the processor 12), which may request and cause the cellular transmitter 52 to send the cellular signal. Moreover, the base station 102 may schedule the user equipment 10 for uplink, and transmit the transmission frequency range (e.g. a frequency band or channel) that is to be used for the uplink to the user equipment 10. For example, the base station 102 may transmit the LTE frequency band 13 or 14, or a channel in the LTE frequency band 13 or 14, to the user equipment 10.

In process block 112, the processor 12 receives or determines a location of the user equipment 10. In particular, the GNSS receiver 56 of the user equipment 10 may receive GNSS signals from the GNSS network 104 via the GNSS satellite 106, and determine the location of the user equipment 10 based on the GNSS signals. In process block 114, the processor 12 receives or determines a date and/or time. For example, the user equipment 10 may receive or determine a current local date and/or time from an internal clock (e.g., a crystal, a crystal oscillator, a voltage-controlled crystal oscillator, or the like), cellular signals received at the cellular receiver 54 from the cellular network 100 via the cellular base station 102, and/or GNSS signals received at the GNSS receiver 56 from the GNSS network 104 via the GNSS satellite 106.

In process block 116, the processor 12 receives or determines historical resource block allocation information based on the transmission frequency range received in process block 111, the location of the user equipment 10 received in process block 112, the date received in process block 114, and/or the time received in process block 114. In particular, the processor 12 may generate resource block allocation profiles based on resource blocks allocated on different dates, times, and/or locations. That is, as the user equipment 10 communicatively couples to the cellular network 100 via the cellular base station 102 over time, the user equipment 10 store information (e.g., in the form of resource block allocation profiles) related to the resource blocks allocated by the cellular network 100, the date the resources blocks are allocated, the time the resources blocks are allocated, the location that the user equipment 10 is located, and so on. For example, the user equipment 10 may communicatively couple to the cellular network 100 via the cellular base station 102 at noon on January $1^{st}$ in San Francisco, and receive one or more resource blocks allocated from the cellular network 100. Moreover, resource block allocation profiles may be further distinguished based on day of the week (e.g., to identify resource block allocation trends that differ based on different days of the week, weekends vs. weekdays, and so on), special events for the time of year (e.g., holidays), times of day corresponding to special events (e.g., parades, concerts, sporting events), and so on.

The user equipment 10 may store this information in a resource block allocation profile. In some embodiments, the processor 12 may store the resource block allocation profiles and/or such information in the memory 14 and/or the storage device 16 of the user equipment 10. Each resource block allocation profile may be represented as a table, lookup table, equation, transfer function, heatmap, or so on. In some embodiments, the user equipment 10 may store the resource block allocation profiles in a database that is indexed by resource block, date, time, location, geographical area, and so on.

Additionally, such information may be received by the user equipment 10 from other user equipment and stored as resource block allocation profiles. In particular, the user equipment 10 may perform crowdsourcing techniques to receive or capture information related to the resource blocks allocated by the cellular network 100, the date the resources blocks are allocated, the time the resources blocks are allocated, the location that the other user equipment is located. In this manner, the user equipment 10 may have more data points and a more accurate representation of what resource blocks are allocated and under what circumstances (e.g., date, time, location, and so on).

To conserve memory and/or storage resources, in some cases, the user equipment 10 may upload the resource block allocation profiles to cloud storage, the cellular network 100, or the like. As such, the user equipment 10 may download and/or store (e.g., in the memory 14 and/or the storage 16) at least some resource block allocation profiles, such as those corresponding to the location of the user equipment 10 and/or those corresponding to the current time (e.g., for a threshold time range corresponding to the current time, such as a two hour time range centered at the current time), date, and/or day of the week. The user equipment 10 may then receive or determine, using, for example, the resource block allocation profiles corresponding to the location of the user equipment 10, time, and/or date, historical resource block allocation by the cellular network 100.

Additionally or alternatively, in process block 118, the processor 12 receives or determines a signal characteristic for transmitting the cellular signal (e.g., for which an indication was received in process block 111). The signal characteristic may include any suitable indication of a signal quality or strength, such as a resource signal strength indicator (RSSI), a reference signal received power (RSRP), a reference signal received quality (RSRQ), a signal to interference plus noise ratio (SINR), a signal to noise plus interference ratio (SNIR), a signal to noise ratio (SNR), and so on. For example, the processor 12 may determine an RSSI for the transmission frequency range (e.g., the LTE frequency band 13 or 14 or a channel of the LTE frequency band 13 or 14) received in process block 111 when communicating with the base station 102.

In process block 120, the processor 12 receives or determines a likelihood of transmitting the cellular signal (e.g., for which an indication was received in process block 111, and on the transmission frequency range received in process block 111) at increased or maximum transmission power based on the signal characteristic. Increased transmission power may refer to transmission power greater than a threshold transmission power (e.g., greater than 50% or more transmission power, greater than 60% or more transmission power, greater than 70% or more transmission power, and so on), greater than average transmission power, greater than a median transmission power, and so on. Maximum transmission power may refer to a maximum transmission power that the cellular transmitter 52 is enabled and/or allowed to transmit based on rules promulgated by regulatory bodies (e.g., the Federal Communications Commission (FCC), hardware capabilities, telecommunication specifications (e.g., 3GPP specifications), and so on).

In some embodiments, the user equipment 10 may generate and/or refer to a relationship (which may be represented as a table, lookup table, equation, transfer function, heatmap, or so on) that relates the signal characteristic (e.g., RSSI) to a transmission power that the cellular transmitter 52 uses to transmit the cellular signal on the frequency band it has been allocated by the cellular network 100 (e.g., the LTE frequency band 13 or 14). For example, the greater the RSSI, the better the cellular coverage is for the user equipment 10 as provided by the cellular network 100, and the lower transmission power may be used and lower probability of retransmission by the cellular transmitter 52 to transmit the cellular signal on the frequency band. On the other hand, the lower the RSSI, the worse the cellular coverage is for the user equipment 10, and the greater transmission power may be used and the greater likelihood of retransmission by the cellular transmitter 52 to transmit the cellular signal on the frequency band. In some cases, the processor 12 may use artificial intelligence and/or machine-learning techniques to determine the likelihood of transmitting a cellular signal at increased or maximum transmission power based on the signal characteristic, as explained in further detail below.

Additionally or alternatively, the processor 12 receives or determines a client type for which the cellular signal is to be sent using the cellular transmitter 52. As mentioned above, a client may execute a process on the user equipment 10, which may request and cause the cellular transmitter 52 to send the cellular signal. Each client, such as a voice call, video call, video game, other source of request for data, and so on, may be associated with a different duty cycle (e.g., a frequency and/or duration at which data is requested), which may impact resource block allocation or assignment.

In process block 124, the processor 12 receives or determines a signal environment for GNSS. For example, in cases where the signal environment has less obstructions and/or more open sky, such as rural environments, a stronger GNSS signal may be received by the GNSS receiver 56. As such, there may be a decreased likelihood that performing a mitigation procedure is necessary due to the stronger GNSS signal being less likely to be affected and/or degraded by a harmonic of a cellular transmission signal. On the other hand, if the signal environment has more obstructions and/or less open sky, such as an urban environment or a wooded area, a weaker GNSS signal may be received by the GNSS receiver 56. Moreover, urban environments may also include more cellular base stations 102, which may further weaken a GNSS signal. As such, there may be an increased likelihood that performing a mitigation procedure is necessary due to the weaker of the GNSS signal being more likely to be affected and/or degraded by a harmonic of a cellular transmission signal.

In process block 124, the processor 12 receives or determines real world conditions that may affect resource block allocation. This may, for example, include some of the time-based factors discussed above, such as holidays, parades, sporting events, and so on, which may change an expected pattern of demand on the cellular network 100, thus affecting resource block allocation by the cellular network 100. As another example, natural disasters, pandemics, national and/or local emergencies may cause sudden surges in demand on the cellular network 100, thus affecting resource block allocation by the cellular network 100.

In process block 128, the resource block allocation probability engine 58 determines a probability (e.g., a resource block use probability) that the cellular network 100 may allocate a resource block to the user equipment 10 having a frequency that, when the cellular transmitter 52 transmits a signal using the resource block, may generate harmonic signal that interferes with a GNSS signal received by the GNSS receiver 56. In particular, the resource block may be within the LTE frequency band 13 or 14 (e.g., the resource block denoted as 1 RB 49), and the GNSS signal may be within the GNSS L1 frequency band.

As illustrated, the resource block allocation probability engine 58 may receive the historical resource block allocation information as determined in process block 116, the likelihood of transmitting the signal at increased or maximum transmission power as determined in process block 120, the client type for which a signal is to be transmitted as determined in process block 122, the signal environment for GNSS as determined in process block 124, and/or the real world conditions as determined in process block 126, from the processor 12. The resource block allocation probability engine 58 may then determine, based on any combination of these factors that may impact resource block allocation, a probability that the cellular network 100 may allocate a resource block to the user equipment 10 having a frequency that may generate harmonic signal that interferes with a GNSS signal received by the GNSS receiver 56.

For example, the resource block allocation probability engine 58 may receive a transmission frequency range from process block 111, a location of the user equipment 10 from process block 112, a current local time from process block 114, and receive historical resource block allocation information in the form of a set of crowdsourced resource block allocation profiles from process block 116. The set of crowdsourced resource block allocation profiles may be indexed by transmission frequency range, location, and time. As such, the resource block allocation probability engine 58 may select a resource block allocation profile based on the transmission frequency range, the location, and time, and determine a probability that the user equipment 10 will be allocated a resource block that interferes with GNSS.

Additionally or alternatively, the resource block allocation probability engine 58 may receive a transmission frequency range from process block 111 and determine a signal characteristic (e.g., RSSI) for transmitting a signal using the transmission frequency range from process block 118. The resource block allocation probability engine 58 may then determine a likelihood of transmitting the signal at increased or maximum transmission power. For example, if the RSSI is greater (e.g., than a threshold), then the cellular transmitter 52 may use lower transmission power and there is a lower likelihood of retransmission, and the resource block allocation probability engine 58 may determine that there is a lower likelihood of transmitting the signal at increased or maximum transmission power. On the other hand, if the RSSI is lower (e.g., than a threshold), then the cellular transmitter 52 may use higher transmission power and there is a higher likelihood of retransmission, and, as such, the resource block allocation probability engine 58 may determine that there is a greater likelihood of transmitting the signal at increased or maximum transmission power. The resource block allocation probability engine 58 may then determine a probability that the user equipment 10 will be allocated a resource block that interferes with GNSS.

The resource block allocation probability engine 58 may additionally or alternatively receive an indication of a type of a client requesting or causing the cellular transmitter 52 to transmit a cellular signal (e.g., on the LTE frequency band 13 or 14) from process block 122, and determine a probability that the user equipment 10 will be allocated a resource block that interferes with GNSS based on the client type. For example, the resource block allocation probability engine 58 may determine a duty cycle (e.g., a frequency and/or duration at which data is requested) associated with the client (e.g., based on a type of the client), and determine a probability that the user equipment 10 will be allocated a resource block that interferes with GNSS based on the duty cycle. That is, the frequency and/or duration at which data is requested by certain client types may affect allocation of resource blocks by the cellular network 100.

The resource block allocation probability engine 58 may additionally or alternatively receive a signal environment (e.g., less obstructions vs. more obstructions) for GNSS from process block 124, and determine a probability that the user equipment 10 will be allocated a resource block that interferes with GNSS based on the signal environment. In particular, a clearer signal path between the user device 10 and the GNSS satellite 106 may result in a higher (e.g., than a threshold) GNSS receive power, while a more obstructed signal path between the user device 10 and the GNSS satellite 106 may result in a lower (e.g., than a threshold) GNSS receive power. The resource block allocation probability engine 58 may then determine a probability that the user equipment 10 will be allocated a resource block that interferes with GNSS based on a likely GNSS receive power estimated based on the signal environment.

The resource block allocation probability engine 58 may additionally or alternatively receive real world conditions in process block 126, such as whether there is an impending or current natural disaster, pandemic, and so on, and determine a probability that the user equipment 10 will be allocated a resource block that interferes with GNSS based on the real world conditions.

In some embodiments, the resource block allocation probability engine 58 may perform any suitable weighting techniques to the factors described above to generate the probability that the user equipment 10 will be allocated a resource block that interferes with GNSS. That is, the resource block allocation probability engine 58 may apply (e.g., multiply) a weight to each evaluated factor, and determine the probability by combining (e.g., summing) the weighted factors. In additional or alternative embodiments, the resource block allocation probability engine 58 may use artificial intelligence and/or machine-learning to determine the allocation probability and/or the interference probability. Similarly, and as mentioned above, the processor 12 may determine the likelihood of transmitting a cellular signal at increased or maximum transmission power based on the signal characteristic. As used herein, machine-learning may refer to algorithms and statistical models that computer systems (e.g., including the user equipment 10) use to perform a specific task with or without using explicit instructions. For example, a machine-learning process may generate a mathematical model based on a sample of data, known as "training data," in order to make predictions or decisions without being explicitly programmed to perform the task.

Depending on the inferences to be made, the resource block allocation probability engine 58 and/or the processor 12 may implement different forms of machine-learning. For example, in some embodiments (e.g., when particular known examples exist that correlate to future predictions or estimates that the machine-learning engine may be tasked with generating), a machine-learning engine may implement supervised machine-learning. In supervised machine-learning, a mathematical model of a set of data contains both inputs and desired outputs. This data is referred to as "training data" and may include a set of training examples. Each training example may have one or more inputs and a desired output, also known as a supervisory signal. In a mathematical model, each training example is represented by an array or vector, sometimes called a feature vector, and the training data is represented by a matrix. Through iterative optimization of an objective function, supervised learning algorithms may learn a function that may be used to predict an output associated with new inputs. An optimal function may allow the algorithm to correctly determine the output for inputs that were not a part of the training data. An algorithm that improves the accuracy of its outputs or predictions over time is said to have learned to perform that task.

Supervised learning algorithms may include classification and regression techniques. Classification algorithms may be used when the outputs are restricted to a limited set of values, and regression algorithms may be used when the outputs have a numerical value within a range. Similarity learning is an area of supervised machine-learning closely related to regression and classification, but the goal is to learn from examples using a similarity function that measures how similar or related two objects are. Similarity learning has applications in ranking, recommendation systems, visual identity tracking, face verification, and speaker verification.

Additionally and/or alternatively, in some situations, it may be beneficial for the machine-learning engine to utilize unsupervised learning (e.g., when particular output types are not known). Unsupervised learning algorithms take a set of data that contains only inputs, and find structure in the data, like grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data.

That is, the machine-learning engine may implement cluster analysis, which is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters. In additional or alternative embodiments, the machine-learning engine may implement other machine-learning techniques, such as those based on estimated density and graph connectivity.

In any case, the resource block allocation probability engine 58 may determine a probability (e.g., an allocation probability) that the cellular network 100 may allocate a resource block to the user equipment 10 having a frequency that, when the cellular transmitter 52 transmits a signal using the resource block, a harmonic signal may be generated that interferes with a GNSS signal received by the GNSS receiver 56. In some embodiments, the resource block allocation probability engine 58 may determine an interference probability that cellular transmission by the cellular transmitter 52 may interfere with the GNSS signal based on the allocation probability.

In decision block 130, the resource block allocation probability engine 58 determines whether the probability indicates that interference will occur. For example, the resource block allocation probability engine 58 may compare the probability to a threshold probability. The threshold probability may be any suitable value that indicates that interference between cellular transmission on the allocated resource block(s) and a GNSS signal may occur, such as 25% or greater, 30% or greater, 40% or greater, 50% or greater, 60% or greater, 70% or greater, 75% or greater, 80% or greater, 85% or greater, and so on.

If the probability indicates that interference will not occur (e.g., if the probability is less than a threshold probability), then, in process block 132, the processor 12 causes the cellular transmitter 52 to transmit the signal (e.g., for which an indication was received in process block 111) to the base station 102 (e.g., over the LTE frequency band 13 and/or 14) without performing a mitigation procedure. On the other hand, if the probability indicates that interference will occur (e.g., if the probability is greater than or equal to the threshold probability), then, in process block 134, the processor 12 performs one or more mitigation procedures, such as decreasing power to the cellular transmitter 52 or preventing the cellular transmitter 52 from transmitting a signal (e.g., including by deactivating the cellular transmitter 52), decreasing a gain of or deactivating the GNSS receiver 56, and/or activating one or more filters 84 (e.g., one or more resource block combination-based machine-learning filters) of the GNSS receiver 56 to filter at least a portion of the transmission signal from a GNSS signal received at the GNSS receiver 56. In such a case, the processor 12 may transmit the signal if, for example, the processor 12 decreases power to the cellular transmitter 52, decreases the gain of or deactivates the GNSS receiver 56, and/or activates the one or more filters 84 of the GNSS receiver 56 to filter at least the portion of the signal from the GNSS signal received at the GNSS receiver 56, and so on. In other cases, the processor 12 may transmit the signal if, for example, prevents or blocks the cellular transmitter 52 from transmitting the signal, deactivates the cellular transmitter 52, and so on.

In this manner, the method 110 enables the processor 12 to selectively enable transmission of cellular signals based on the probability that the cellular network 100 may allocate a resource block to the user equipment 10 having a frequency that, when the cellular transmitter 52 transmits a signal using the resource block, a harmonic signal may be generated that interferes with a GNSS signal received by the GNSS receiver, as determined by the resource block allocation probability engine 58. Thus, performance of transmission functions (e.g., for which process block 132 provides an illustrative example) based on this probability that interference will occur, when mitigation procedures might otherwise be imposed, effectively cancels or otherwise prevents implementation of the mitigation procedures for a period of time.

Advantageously, the disclosed embodiments enable the user equipment 10 to conserve power by selectively activating the one or more filters 84 of the GNSS receiver 56 for mitigation purposes, instead of constantly running the one or more filters 84. Indeed, in general, because the discussed mitigation procedures are performed only when the resource block allocation probability engine 58 determines that there is a higher (e.g., than a threshold) likelihood that the cellular network 100 may allocate a resource block to the user equipment 10 having a frequency that, when the cellular transmitter 52 transmits a signal using the resource block, a harmonic signal may be generated that interferes with a GNSS signal received by the GNSS receiver 56, performance gains may be realized (e.g., compared to running the mitigation procedures each time there is a transmission on the LTE frequency band 13 and/or 14).

Moreover, because the mitigation procedures are not constantly being run or at least have decreased run frequencies and/or runtimes, other signals may then be received by the user equipment 10. For example, signals received by the European Union's Galileo GNSS may be filtered out by the mitigation procedures. Implementing the disclosed embodiments to avoid constantly performing the mitigation procedures or at least decreasing run frequencies and/or runtimes of the mitigation procedures may increase a likelihood of receiving Galileo signals or an increased signal quality of Galileo signals. Additionally, because the resource block allocation probability engine 58, at least in some embodiments, may be a software-based implementation, such embodiments may be selectively deactivated (e.g., in the case of a world or emergency event, such as an E911 case) to enable constantly running the mitigation procedures in an effort to guarantee increased or maximum receive GNSS signal quality.

It should be understood that, in some cases, the user equipment 10 may receive, from the cellular network 100 or the base station 102, a number of resource blocks allocable (e.g., for a next time period or millisecond). However, it may take the user equipment 10 time (e.g., on the order of seconds) to perform the disclosed mitigation procedures, which may be greater than the time between receiving the indication of the number of resource blocks allocable and the time one or more of the allocable resource blocks are allocated to the user equipment 10 (e.g., on the order of milliseconds, such as 1 ms). As such, performing a mitigation procedure based on receiving an indication of the number of resource blocks allocable from the cellular network 100 or the base station 102 may not be feasible. The disclosed embodiments, then, may avoid or decrease the likelihood of these unfeasible scenarios, as they enable selectively performing mitigation procedures, instead of always performing the mitigation procedures (e.g., when transmitting using the LTE frequency bands 13 and/or 14).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
   a transceiver;
   a global navigation satellite systems (GNSS) receiver; and
   processing circuitry configured to
      receive an indication to transmit a signal using the transceiver,
      receive a location via the GNSS receiver,
      receive a time of day,
      selectively mitigate interference on signals received by the GNSS receiver resulting from transmitting the signal using the transceiver based on the location and the time of day, and
      cause the transceiver to transmit the signal based on selectively mitigating the interference.

2. The user equipment of claim 1, wherein the processing circuitry is configured to selectively mitigate the interference by determining a probability of the user equipment being allocated one or more resource blocks from a network that are associated with a first frequency that overlaps with a second frequency used by the GNSS receiver, the probability being based on the location and the time of day.

3. The user equipment of claim 2, wherein the processing circuitry is configured to receive a historical resource block allocation associated with the location and the time of day, and selectively mitigate the interference based on the historical resource block allocation.

4. The user equipment of claim 3, wherein the historical resource block allocation is provided via multiple user equipment.

5. The user equipment of claim 2, wherein the processing circuitry is configured to selectively mitigate the interference by mitigating the interference based on the probability of the user equipment being allocated the one or more resource blocks being greater than or equal to a threshold probability.

6. The user equipment of claim 2, wherein the processing circuitry is configured to selectively mitigate the interference by not mitigating the interference based on the probability of the user equipment being allocated the one or more resource blocks being less than a threshold probability.

7. The user equipment of claim 1, wherein the processing circuitry is configured to cause the transceiver to transmit the signal based on selectively mitigating the interference by causing the transceiver to transmit the signal based on mitigating the interference, and preventing the transceiver from transmitting the signal based on not mitigating the interference.

8. The user equipment of claim 1, wherein the processing circuitry is configured to mitigate the interference by decreasing a gain of the GNSS receiver.

9. The user equipment of claim 1, wherein the GNSS receiver is configured to receive a GNSS signal having a GNSS frequency that is a multiple of a transmission frequency of the signal.

10. The user equipment of claim 9, wherein the GNSS frequency is within a GNSS L1 frequency band.

11. The user equipment of claim 9, wherein the processing circuitry is configured to
    receive a date, and
    selectively mitigate the interference on the signals received by the GNSS receiver resulting from transmitting the signal using the transceiver based on the location, the time of day, and the date.

12. The user equipment of claim 1, wherein the GNSS receiver comprises one or more filters configured to filter at least a portion of the signal from a GNSS signal, and the processing circuitry is configured to mitigate the interference activating the one or more filters.

13. A method, comprising:
    receiving, via processing circuitry of user equipment, an indication to transmit a signal using a transceiver of the user equipment;
    receiving, via the processing circuitry, a location by way of a global navigation satellite systems (GNSS) receiver of the user equipment;
    receiving, via the processing circuitry, a time of day;
    selectively mitigating, via the processing circuitry, interference on signals received by the GNSS receiver resulting from transmitting the signal using the transceiver based on the location and the time of day; and
    causing, via the processing circuitry, the transceiver to transmit the signal based on selectively mitigating the interference.

14. The method of claim 13, comprising:
    determining, via the processing circuitry and based on the location and the time of day, a probability of the user equipment being allocated one or more resource blocks from a network that are associated with a first frequency that overlaps with a second frequency used by the GNSS receiver; and
    selectively mitigating, via the processing circuitry, the interference based on the probability.

15. The method of claim 14, comprising selectively mitigating, via the processing circuitry, the interference based on the probability being greater than or equal to a threshold probability.

16. The method of claim 13, comprising:
    receiving, via the processing circuitry, a date; and
    selectively mitigating, via the processing circuitry, the interference on the signals received by the GNSS receiver resulting from transmitting the signal using the transceiver based on the location, the time of day, and the date.

17. One or more tangible, non-transitory, computer-readable media, storing computer-readable instructions configured to cause one or more processors of a wireless communication device to:
    receive an indication to transmit a signal using a transmitter of the wireless communication device;
    receive a location of the wireless communication device and a time of day;
    receive crowdsourced resource block allocation data corresponding to the location of the wireless communication device and the time of day;
    receive resource block use probability for transmitting the signal using the transmitter based on the crowdsourced resource block allocation data;
    selectively mitigate interference resulting from transmitting the signal using the transmitter based on the resource block use probability; and
    cause the transmitter to transmit the signal based on selectively mitigating the interference.

18. The one or more tangible, non-transitory, computer-readable media of claim 17, wherein the computer-readable instructions are configured to cause the one or more processors to receive real world conditions and receive the resource block use probability based on the crowdsourced resource block allocation data and the one or more real world conditions.

19. The one or more tangible, non-transitory, computer-readable media of claim 18, wherein the one or more real world conditions comprise a holiday, a parade, a sporting event, a natural disaster, a pandemic, a national emergency, or a local emergency, or any combination thereof.

20. The one or more tangible, non-transitory, computer-readable media of claim 17, wherein the resource block use probability is determined using machine-learning.

\* \* \* \* \*